No. 656,041. Patented Aug. 14, 1900.
J. N. PARKS.
BACK PEDAL BRAKE AND COASTER.
(Application filed Dec. 8, 1899.)
(No Model.)

WITNESSES:
Miles V. Easterby
George Halleway

INVENTOR:
John N. Parks,
By Moulton & Flanders,
Attorneys.

UNITED STATES PATENT OFFICE.

JOHN N. PARKS, OF ROCHESTER, NEW YORK.

BACK-PEDAL BRAKE AND COASTER.

SPECIFICATION forming part of Letters Patent No. 656,041, dated August 14, 1900.

Application filed December 8, 1899. Serial No. 739,634. (No model.)

*To all whom it may concern:*

Be it known that I, JOHN N. PARKS, a citizen of the United States, residing at Rochester, in the county of Monroe and State of New York, have invented certain new and useful Improvements in Back-Pedal Brakes and Coasters; and I do hereby declare the following to be a full, clear, and exact description of the invention, such as will enable others skilled in the art to which it appertains to make and use the same.

My invention relates to improvements in back-pedal brakes and coasters for bicycles; and its object is to provide the same with certain new and useful features hereinafter more fully described, and particularly pointed out in the claims, reference being had to the accompanying drawings, in which—

Figures 1, 8:
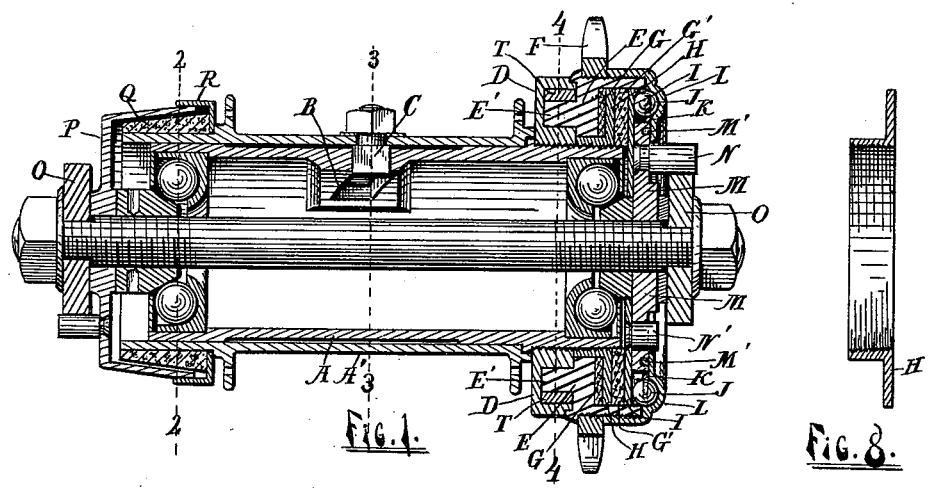
Figure 2:
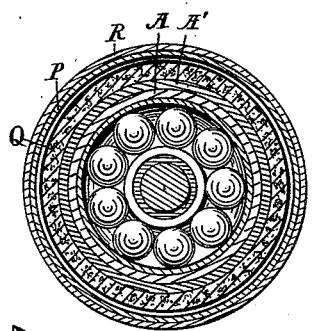
Figure 7:
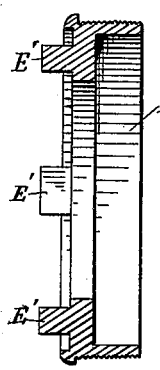
Figure 4:
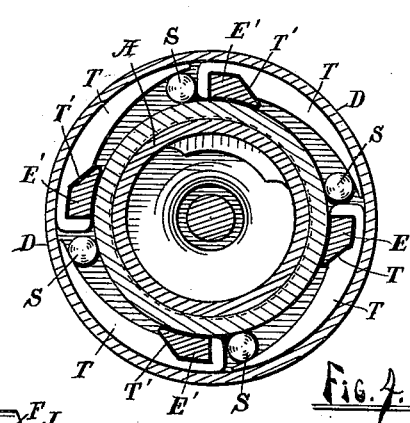
Figure 3:
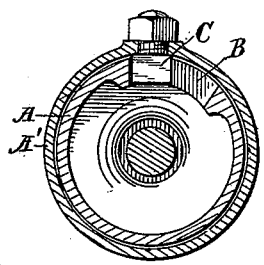
Figure 5:
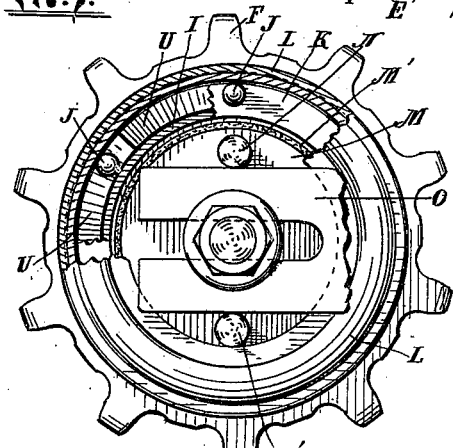
Figure 6:
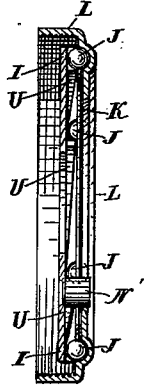

Figure 1 is a vertical section, through the axis thereof, of a device embodying my invention; Fig. 2, a transverse vertical section of the same on the line 2 2 of Fig. 1; Fig. 3, a similar section on the line 3 3 of Fig. 1; Fig. 4, a like section on the line 4 4 of Fig. 1; Fig. 5, an end elevation of the same with parts broken away to show the construction; Fig. 6, a sectional detail of a portion of the brake mechanism; Fig. 7, a sectional detail of the driving-ring, and Fig. 8 a sectional detail of the friction-flange.

Like letters refer to like parts in all of the figures.

A represents an inner hub mounted on ball-bearings and provided with a spiral slot B near its middle.

A' is an outer hub surrounding the inner hub and rotative thereon and also longitudinally movable on the same and held in place on the inner hub by means of a detachable stud C, fixed in the outer hub and engaging the spiral slot B in the inner hub. The outer hub A' is provided with the usual sprocket-flanges for the rear wheel, and on the end opposite the sprocket-wheel it is also provided with a conical friction-surface Q, adapted to engage the inner surface of a fixed cup P whenever the outer hub is moved longitudinally for that purpose, as hereinafter described.

R is a dust-cap inclosing the open end of the cup P and attached to the outer hub A' and rotative therewith.

On the inner hub is secured a ring D, having a channel in its outer side in which are segmental wedges T, having recesses with inclined forward sides T' and adapted to receive lugs E' on the driving-ring E, which lugs have corresponding inclined faces to engage the inclined surface T'.

S are rolls in the channel of the ring D and engaging the wedges T. A sprocket-ring F is fixed on the driving-ring E to engage the usual driving-chain.

H is a friction-flange having a central boss upon which the driving-ring is freely rotative and which boss is provided with a left-hand thread and abuts against the ring D, which ring has a right-hand thread. The boss thus serves as a lock-nut to secure the ring D in place. Between the friction-flange H and the driving-ring E is a washer G, of fiber or other suitable material, to form a friction-surface, and a similar washer G', of like material, engages the opposite side of the friction-flange. A disk I engages the last-named washer and is held from rotating and permitted to move laterally by means of a pin N', longitudinally movable in an opening in a fixed plate M, which plate is clamped between the cone-bearing and the frame O by means of the axis-bolt and is also held from turning by means of a stud N, fixed in the said plate and engaging the frame O. On the disk I are a series of segmental outwardly-inclined surfaces U, engaged by a series of balls J, which balls at the opposite side engage a circular channel in an annular cap L, secured to the driving-ring E and rotative therewith.

M' is a ring-packing near the periphery of the plate M to form a tight joint between said plate and the cap L.

K is a ring having suitable equidistant openings, in which are located the balls J, whereby the balls are kept spaced at an equal distance apart and moved simultaneously relative to the inclines U, thus forcing the disk I uniformly all around against the washer G', as hereinafter described.

When the driving-ring E is turned forward by the sprocket F, the lugs E' drive the wedges T forward and outward. The wedges are thus driven in between the rolls S and the lugs E' on one side and the surface of the channel in the ring D on the other side and operate as a friction-clutch, connecting the driving-ring with the ring D, and thus drive the inner hub forward. This brings the stud C firmly against the rear end of the spiral slot B and moves the outer hub toward the ring D, thus freeing the friction-surface Q from the cup P and allowing the outer hub to rotate freely. At the same time the forward movement of the cap L rolls the balls J down the inclines U and permits the disk I to move away from the washer G' and releases all pressure upon the friction-flange H, thus allowing the inner hub to rotate freely. When coasting, the driving-ring E is held stationary, which holds the wedges T from rotating with the ring D. The lugs E thus withdraw the wedges from between the rolls S and the surface of the channel and also removes the contact between the inclined sides of the lugs and recesses, which effectively releases the clutch mechanism connecting the driving-ring and the ring D. The cap L is now stationary and the balls J opposite the thin end of the inclines U, and thus the friction-flange H continues to run forward freely. Any backward movement of the pedals will turn the driving-ring E and the cap L backward, which movement will roll the balls J up the inclines U and force the disk I against the washer G' and pull the driving-ring E against the washer G, and thus bind the rotating friction-surface between the driving-ring E at one side and the disk I at the other side with greater or less pressure, according to the back pressure on the pedals. This at once retards the rotation of the inner hub, and the outer hub being free to rotate thereon will now turn forward on the inner hub, which carries the stud C forward within the spiral slot B. This movement forces the outer hub longitudinally toward the cup P and brings the friction-surface Q in contact with the inner surface of the same with greater or less force, according to the amount of resistance due to the friction on the flange H. I thus secure the action of a compound brake, the inner hub being retarded by the friction upon the two opposing surfaces of the flange H and the outer hub being retarded by the friction of the conical friction-surface Q against the inner surface of the cup P. I also avoid all strain upon the frame or axis-bolt due to the action of the brake attached to the inner hub and have but very little strain due to the brake on the outer hub because of its conical form, the pressure being mostly radial to the axis. It will also be observed that the outer hub and its brake may be omitted, and the device will operate quite satisfactory, but requiring more back pressure on the pedals.

Having thus fully described my invention, what I claim, and desire to secure by Letters Patent, is—

1. The combination of an inner hub, an outer hub longitudinally movable on the inner hub, means for moving the hubs longitudinally relative to each other, a friction-surface attached to the outer hub and rotative therewith, a fixed friction-surface to engage the same, means for rotating the inner hub, means for retarding the rotation of the inner hub, and means for forcing the wedges against the ring, substantially as described.

2. The combination of an inner hub having a spiral slot, an outer hub both rotatively and longitudinally movable on the inner hub and having a conical friction-surface on the outer hub, and a fixed cup to engage said friction-surface, and means for driving and retarding the rotation of the inner hub, substantially as described.

3. The combination of an inner hub having a spiral slot, a sprocket-wheel rotative on the said hub, a clutch connecting the wheel and the hub, a brake to retard the movement of the hub, an outer hub rotative and longitudinally movable on the inner hub, a stud on the outer hub engaging the spiral slot, a conical friction-surface on the outer hub, and a fixed cup engaging said friction-surface, substantially as described.

4. The combination of a hub, a ring fixed on the hub and having a channel in its side, segmental wedges in said channel and having recesses, a driving-ring rotative on the hub, and lugs on the driving-ring engaging the recesses in the wedges, and rolling means for operating said wedges, substantially as described.

5. The combination of a hub, a ring secured to the hub and having a channel in its side, segmental wedges freely movable in the channel, and having recesses with inclined forward sides, a driving-ring rotative on the hub, and lugs on the driving-ring to engage the recesses in the wedges and having corresponding inclined forward sides, and rolling means for operating said wedges, substantially as described.

6. The combination of a hub, a ring secured to the hub and having a channel in its side, segmental wedges and rolls freely movable in the channel, a driving-ring rotative on the hub, and having lugs engaging recesses in the wedges, and a brake operated by the driving-ring when the latter is turned backward, substantially as described.

7. The combination of a hub, a ring fixed on the hub and having a channel in its side, segmental wedges freely movable in the said channel and having recesses with inclined forward sides, rolls in the channel and engaging the wedges, a driving-ring rotative on the hub and having lugs with inclined forward sides and engaging the recesses in the wedges, and a brake operated by the driving-ring when the latter is turned backward, substantially as described.

8. The combination of a hub, a friction-flange fixed on the hub and rotating therewith, a driving-ring rotative and longitudinally movable on the hub and adjacent to one side of the friction-flange, a non-rotative and laterally-movable disk at the other side of the friction-flange, and means for forcing the disk and driving-ring against the opposite sides of the friction-flange, when the driving-ring is turned backward, substantially as described.

9. The combination of a hub, a friction-flange fixed on the hub and rotating therewith, a driving-ring rotative on the hub and adjacent to one side of the friction-flange, a clutch connecting the ring and hub, a non-rotating and laterally-movable disk at the other side of the friction-flange, and having inclined surfaces, balls engaging the said surfaces, and a cap engaging the balls and attached to the driving-ring, substantially as described.

10. The combination of a hub, a ring fixed on the hub and having a channel in its side, a friction-flange fixed on the hub, a driving-ring rotative on the hub, wedges in the channel of the fixed ring, and having recesses, rolls in said channel engaging the wedges, lugs on the driving-ring engaging the recesses in the wedges, a non-rotative and laterally-movable disk engaging the friction-flange and having inclined surfaces, balls engaging said surfaces, a cap engaging the balls and attached to the driving-ring, and rotative therewith, substantially as described.

11. The combination of an inner hub, a ring fixed on the hub and having a channel in its side, a friction-flange fixed on the hub, a driving-ring at one side of the friction-flange, and having lugs with inclined forward sides, and rotative on the hub, wedges in the channel of the fixed ring and having recesses with inclined forward sides, rolls in the said channels engaging the wedges, a laterally-movable disk engaging the friction-flange at the side opposite the driving-ring, and having segmental outwardly-inclined surfaces, balls engaging the same, a cap engaging the balls and secured to the driving-ring and rotative therewith, an outer hub rotatively and longitudinally movable on the inner hub, a stud fixed in the outer hub and engaging a spiral slot in the inner hub, a friction-cone on the outer hub, and a fixed cap engaging the same, substantially as described.

12. The combination of an inner hub, a driving-ring rotative on the same, a clutch connecting the driving-ring with the hub, a friction-flange rotative with the hub and adjacent to the driving-ring, a non-rotative and laterally-movable disk adjacent to the friction-flange, inclined surfaces on the disk, balls engaging said surfaces, and a cap engaging the balls and attached to the driving-ring, and rotative therewith, an outer hub spirally movable on the inner hub, a friction-surface on the outer hub and rotative therewith, and a fixed friction-surface engaging the friction-surface on the outer hub, substantially as described.

In testimony whereof I affix my signature in presence of two witnesses.

JOHN N. PARKS.

Witnesses:
   F. BISSELL,
   C. M. PERKINS.